United States Patent [19]

Cope

[11] 4,355,814
[45] Oct. 26, 1982

[54] VIDEO GAME SYMBOL GENERATION AND CONTROL APPARATUS

[75] Inventor: Leonard D. Cope, Merrimack, N.H.

[73] Assignee: Sanders Associates, Inc., Nashua, N.H.

[21] Appl. No.: 770,740

[22] Filed: Feb. 22, 1977

[51] Int. Cl.³ .............................................. A63F 9/22
[52] U.S. Cl. ......................... 273/85 G; 273/DIG. 28; 340/724
[58] Field of Search ............. 273/1 E, 85 G, 102.2 R, 273/102.2 B, DIG. 28, 1; 340/324 AD, 324 M, 723–727, 732, 745; 358/903; 364/200, 900

[56] References Cited

U.S. PATENT DOCUMENTS

| | | | |
|---|---|---|---|
| 3,437,873 | 4/1969 | Eggert | 340/324 AD |
| 3,614,766 | 10/1971 | Kievit | 340/324 AD |
| 3,659,285 | 4/1972 | Baer et al. | 340/324 AD |
| 3,874,669 | 4/1975 | Ariano et al. | 273/85 G |
| 4,026,555 | 5/1977 | Kirschner et al. | 273/102.2 R X |
| 4,034,983 | 7/1977 | Dash et al. | 273/85 G |
| 4,045,789 | 8/1977 | Bristow | 273/DIG. 28 |

Primary Examiner—Vance Y. Hum
Attorney, Agent, or Firm—Louis Etlinger; Richard I. Seligman

[57] ABSTRACT

Apparatus for generating and controlling the position of a displayed symbol for a video game comprises a plurality of voltage comparators responsive to inputs thereto from multiple control voltage sources including a microprocessor and a participant control such that the microprocessor and participant control introduce separate bias offset voltages into the comparators to occasion positioning of the displayed symbol in accordance with the net effect of the multiple inputs.

16 Claims, 1 Drawing Figure

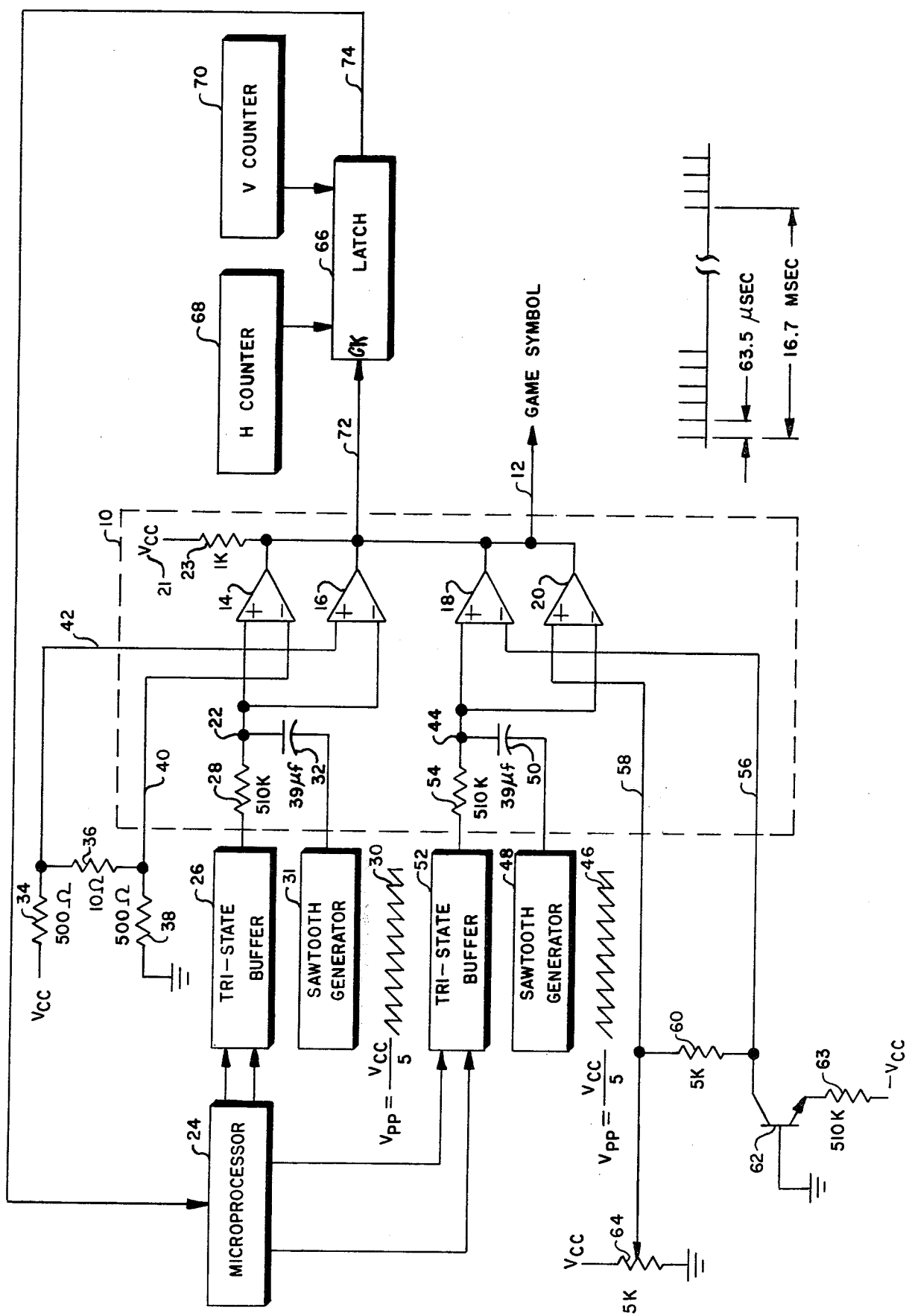

VIDEO GAME SYMBOL GENERATION AND CONTROL APPARATUS

BACKGROUND OF THE INVENTION

This invention relates to video games and more particularly to a character generator and control means therefor.

Electronic game playing devices which generate signals for symbols to be displayed on the screen of television type receivers are known in the prior art and well illustrated by U.S. Pat. Nos. 3,728,480; 3,778,058; 3,829,095; Re 28,507 and Re 28,598, all assigned to the assignee of the present invention. The electronic game playing devices represented by these patents are game attachments for a raster scan cathode ray tube display such as a conventional television receiver or television monitor and having electrical circuitry or components for generating signals which when supplied to the raster scan display will cause the display to show on the screen thereof moveable game playing indicia or symbols or spots. The game playing devices may be incorporated in the raster scan display itself.

The devices of certain ones of the aforementioned patents may be used to play several different games wherein certain ones of the symbols rebound from others when coincident therewith or disappear from the screen of the display when coincident therewith or experience other distinctive motions upon coincidence. Typical games employing these features would be simulated chase games, maze games, table tennis, hockey, tennis, handball and the like. In certain ones of these categories of games one or more simulated player symbols are generated along with a simulated game playing object or ball or puck symbol such that the player symbols are individually controllable in at least one direction.

Typically each participant or player is provided with one or more potentiometers for controlling at least the vertical and possibly also the horizontal location of his displayed player symbol. In a typical game, as for example, hockey, the puck symbol is caused to execute a horizontal sweep across the screen of the display until it is intercepted by a player symbol across its direction of sweep. Puck motion is typically controlled by the charging and discharging of a capacitor, however, digital circuitry such as preset counters have also been used. If the puck is not intercepted by a player but allowed to be hit into the goal then it may move to an off-screen position until reset by one of the players. Many other representative games are also disclosed by the aforementioned patents.

The game playing capability has been enhanced by the employment of microprocessors therein wherein the movement of a game symbol on the screen of a display is controlled in part by the microprocessor and in part by direct control of, for example, a joystick, by a participant/user. Thus, certain commands for occasioning the game symbol movement come from the microprocessor while others come from the joystick. In order to process separate sources of commands, the participant or joystick commands would be inputted to the microprocessor and the microprocessor would output a net command combining the microprocessor command and the participant or joystick command.

This technique for processing multiple commands, while adequate technically, is undesirable in many applications because the work load of the microprocessor is thus greatly increased.

SUMMARY OF THE INVENTION

Accordingly, it is an object of this invention to provide an improved symbol generator operable by commands from multiple sources.

It is another object of this invention to provide a symbol generator for use in conjunction with a microprocessor and a direct player control.

Briefly, a symbol generator is provided in which control of movement of the symbol is occasioned by multiple sources. The symbol generator includes a plurality of voltage comparators which compare the signals from such multiple sources and generate a net signal indicative of the combined instruction from the sources as to the movement of the symbol.

In one embodiment, movement of the symbol is occasioned by participant commands from a potentiometer/joystick and commands from a microprocessor. The comparators generate a signal indicative of the summation of these commands and cause movement of the symbol accordingly.

A feature of the invention is a circuit for monitoring the position of a displayed symbol and supplying this information to a microprocessor such that the microprocessor can simply update commands to cause movement of the symbol from the known position to a new position.

BRIEF DESCRIPTION OF THE DRAWINGS

The above-mentioned and other features and objects of this invention will become more apparent by reference to the following description taken in conjunction with the accompanying drawing which is a block diagram of a preferred embodiment of the invention.

DESCRIPTION OF A PREFERRED EMBODIMENT

Referring now to the drawing, there is illustrated thereby a circuit for generating a simulated player in a video game to be displayed on the screen of a raster scan cathode ray tube. The game symbol or simulated player is generated by a character generator shown within the dotted lines 10. This character generator is so configured as to allow for simultaneous control from multiple sources of movement commands; that is, multiple sources are employed to position the game symbol about the screen of the raster scan display.

In this embodiment character generator 10 comprises four voltage comparators 14, 16, 18 and 20 tied to a voltage source 21 via a resistor 23. Each of these comparators has a plus and minus input and is configured such that when the plus input is greater than the minus input the comparator will be in a high state and when the minus input is greater than the plus input the comparator will be in a low state. The output of the comparator functionally looks like a switch such that when the comparator is high the switch is effectively open, and when the comparator is low the switch is effectively shorted to ground. Thus, if all four of the comparators 14, 16, 18 and 20 are in the high state a game symbol is derived at output 12, however, when any one of the comparators 14, 16, 18 and 20 is in the low state there is no output at 12.

Comparators 14 and 16 provide the horizontal portion of the game symbol and comparators 18 and 20 provide the vertical portion thereof.

The plus input to comparator 14 is the signal at a node 22. Node 22 has two inputs; one input is received from a microprocessor 24 via a tri-state buffer 26 and resistor 28. The second input is a sawtooth waveform 30, having a period equal to 63.5 microseconds, the horizontal sweep rate for United States television systems, which is applied to a node 22 via a capacitor 32. Sawtooth signal 30 is generated in phase with the horizontal sweep circuits of the raster scan display (not shown). The minus input for comparator 14 is a d.c. reference voltage taken from a voltage divider comprising resistors 34, 36 and 38.

Tri-state buffer 26 is conventional and configured to output either a high voltage state, a low voltage state or an open circuit state.

Comparator 14 compares the voltage at the plus input thereto, which is the output from sawtooth source 31 offset by the d.c. voltage from tri-state buffer 26, with the voltage at the minus input, the reference voltage from a line 40 connected to the voltage divider comprising resistors 34, 36 and 38.

Comparator 16 is configured similar to comparator 14, however, its minus input is instead coupled to node 22, and comprises the sawtooth from source 31 offset by the output of tri-state buffer 26. The plus input to comparator 16 is a reference voltage from the voltage divider comprising resistors 34, 36 and 38 and is applied via a line 42. The d.c. reference input to the plus input of comparator 16 is a higher voltage than the d.c. reference input to the minus input of comparator 14.

When the voltage at node 22, comprising the sawtooth 30 offset by the d.c. output from tri-state buffer 26, exceeds the reference voltage applied at the minus input via line 40, comparator 14 will be in its high state and therefore in an open condition. Also, when voltage at node 22 exceeds the reference voltage applied to the plus input of comparator 16 via line 42 that comparator will go from a high to a low state. Thus, the horizontal portion of the game symbol is generated at a position on the screen corresponding to the time that comparator 14 goes high and the width of the symbol is proportional to the time lapse between comparator 14 going high and comparator 16 going low. The crossover point when the sawtooth ramp voltage equals the reference voltage on line 40 is adjusted by varying the d.c. offset at node 22. The microprocessor can thus adjust the horizontal position of the game symbol in this manner.

In other words, the function of comparator 14 is to sense and designate the point when to start writing the game symbol on the display. Comparator 16 establishes a fixed delay beyond such point to designate the end of a game symbol. Thus, some other circuit may be used instead of comparator 16, as for example, a monostable multivibrator.

Thus, the microprocessor 24 positions symbols on the screen of the display by adjusting the d.c. bias (or d.c. offset) voltage at the inputs to the comparators. The output of tri-state buffer 26 acts to either: (1) remove some charge from capacitor 32, or (2) apply additional charge to capacitor 32, or (3) leave conditions as they exist. The effect of this is to cause the game symbol to move with three different velocities due to the charge on capacitor 32.

Comparator 18 of the vertical portion of character generator 10 receives an input at its plus input from a node 44 comprising a signal 46 from a sawtooth source 48 which signal has a period equal to 16.7 milliseconds, the vertical sweep rate for U.S. television systems. This signal is applied to node 44 via a capacitor 50. Signal from source 48 is offset by a d.c. level from a tri-state buffer 52 configured like tri-state buffer 26. The output of tri-state buffer 52 is applied to node 44 via a resistor 54. The minus input to comparator 18 is a reference voltage applied via a line 56.

Comparator 20, the other comparator constituting the vertical portion of character generator 10, receives as its minus input the voltage at node 44, namely, the sawtooth 46 offset by the output from tri-state buffer 52, while the plus input receives a reference voltage via a line 58.

The reference voltages for comparators 18 and 20 differ from the reference voltages for comparators 14 and 16 in that they are not fixed voltages but rather variable voltages. These voltages at lines 56 and 58 are taken from opposite terminals of a resistor 60 in the collector circuit of a transistor 62 with the collector voltage supply for transistor 62 being applied via a potentiometer 64. The voltage on line 56, of course, is always less than the voltage on line 58. The reference voltages for comparators 18 and 20 are thus made to track potentiometer 64. The current through resistor 60 is set constant by the current source comprising transistor 62 and a resistor 63.

Tri-state buffers 26 and 52 are typically integrated circuits, type no. CD4051BE made by RCA while the comparators 14, 16, 18 and 20 are typically integrated circuits, type no. MC 3302P made by Motorola.

Comparator 20 which establishes the end of character can be replaced by some delay circuit such as a monostable multivibrator as in the case of comparator 16, discussed above.

It is thus seen that this configuration of a character generator for generating a game symbol allows for simultaneous control from two sources of movement commands. In the present embodiment the vertical movement commands are derived from two sources; microprocessor 24 and potentiometer 64. The horizontal movement commands are derived only from the microprocessor. However, it is well within the teachings of this invention to replace the fixed d.c. reference voltages applied to the comparators 14 and 16 via lines 40 and 42 with a variable voltage control circuit such as that comprising potentiometer 64, resistors 60, 63 and transistor 62.

In addition to the feature of allowing simultaneous control from two sources of movement commands, another feature of this invention is that the system generates correction signals to a game symbol to cause it to appear at a predetermined position. This feature employs a latch circuit 66 having an input thereto from a horizontal counter 68 and a vertical counter 70. The horizontal and vertical counters are initiated by the horizontal and synchronization signals of the video system not shown herein for purposes of simplification and clarity. When a symbol is generated at output 12, that is, when comparators 14, 16, 18 and 20 are all in the high or open states, a signal is applied via a line 72 to the latch circuit 66 which stores the cartesian coordinates of the symbol, namely, the horizontal and vertical counts from horizontal and vertical counters 68 and 70. These cartesian coordinates are applied via a line 74 to the input to microprocessor 24 which then "knows" where the symbol is on the display screen. The microprocessor then can be programmed to generate correction signals to move from the game symbol from the known position to a new position.

Although forming no part of this invention, the microprocessor would be programmed with the rules of a particular game to be played and the movement of a game symbol would be made pursuant to those rules. In the present character generator the rules of a game might dictate certain symbol movements and these would be applied to the character generator from microprocessor 24 while other movement of a game symbol would be occasioned by a human participant by operating, for example, potentiometer 64.

Also, it should be noted that the principles of the present invention can be applied with any multiple control voltage sources instead of the ones illustrated. For example, the circuit can be employed with multiple source all of which are outputs of one or more microprocessors or all the sources can be direct player control sources such as those provided by transistor 62, resistors 62, 63 and potentiometer 64 or any other types of voltage sources.

In the present embodiment character generator 10 is implemented with analog circuitry but could be digital instead and the signals applied thereto would be digital commands rather than analog signals. Thus, it is to be understood that the embodiment shown is to be regarded as illustrative only, and that many variations and modifications may be made without departing from the principles of the invention herein disclosed and defined by the appended claims.

I claim:

1. Apparatus for generating a symbol adaptable for display on the screen of a raster scan cathode ray tube display and controllable in at least one direction from multiple sources, comprising:
   a first control source providing a first variable control signal for said at least one direction;
   a second control source providing a second variable control signal for said at least one direction;
   means for providing sweep signals at the deflection rate in said one direction;
   means for superimposing said sweep signals on said first control signal;
   means for comparing the output of said superimposing means with said second variable control signal and for generating a signal indicative of the point in said one direction on the display screen where the symbol generation is to begin when the output of said superimposing means is greater than the second control signal; and
   means for generating the symbol.

2. Apparatus as defined in claim 1, wherein one of said control sources includes a constant current source and means for varying the supply voltage thereto.

3. Apparatus as defined in claim 1, wherein said comparing means includes a voltage comparator.

4. Apparatus as defined in claim 3, wherein said means for generating a game symbol includes a voltage source and means for coupling said voltage comparator and a second voltage comparator to said voltage source.

5. Apparatus for generating a symbol adaptable for display on the screen of a raster scan cathode ray tube display and controllable from multiple sources, comprising:
   first, second, third, fourth, fifth and sixth sources of control signals;
   a source of signals sweeping at the horizontal deflection rate;
   a source of signals sweeping at the vertical deflection rate;
   first means for superimposing said signals sweeping at the horizontal deflection rate on said first control signals;
   second means for superimposing said signals sweeping at the vertical deflection rate on said fourth control signals;
   a first voltage comparator having two inputs, one input coupled to said first superimposing means and the second input coupled to said second source of control signals;
   a second voltage comparator having two inputs, one input coupled to said first superimposing means and the second input coupled to said third source of control signals;
   a third voltage comparator having two inputs, one input coupled to said second superimposing means and the second input coupled to said fifth source of control signals;
   a fourth voltage comparator having two inputs, one input coupled to said second superimposing means and the second input coupled to said sixth source of control inputs; and
   means coupled to said voltage comparators for generating a game symbol.

6. Apparatus as defined in claim 5, wherein the output of each of said voltage comparators has two states.

7. Apparatus as defined in claim 6, wherein the output of said first comparator will be in a first state when the amplitude of said first superimposed signal exceeds said second control signal.

8. Apparatus as defined in claim 7, wherein the output of said second comparator will be in a first state when the amplitude of said third control signal exceeds said first superimposed signal.

9. Apparatus as defined in claim 8, wherein the output of said third comparator will be in a first state when the amplitude of said second superimposed signal exceeds said fifth control signal.

10. Apparatus as defined in claim 9, wherein the output of said fourth comparator will be in a first state when the amplitude of said sixth control signal exceeds said second superimposed signal.

11. Apparatus as defined in claim 10, wherein means for generating a game symbol outputs a signal representing a game symbol when said voltage comparators are all in said first state.

12. Apparatus for generating a symbol adaptable for display on the screen of a raster scan cathode ray tube display and controllable in at least one direction from multiple sources, comprising:
   a first control source providing a first variable control signal, said first control source including a microprocessor and a tri-state buffer coupled thereto;
   a second control source providing a second variable control signal;
   means for providing sweep signals at the deflection rate in said one direction;
   means for superimposing said said sweep signals on said first control signal;
   means for comparing the output of said superimposing means with said second variable control signal and for generating a signal indicative of the point in said one direction on the display screen where the symbol generation is to begin when the output of said superimposing means is greater than said second control signal; and
   means for generating the symbol.

13. Apparatus as defined in claim 12, further including a resistor coupling said tri-state buffer to said superimposing means and a capacitor coupling said sweep signal to said superimposing means.

14. Apparatus for generating and controlling a symbol adaptable for display on the screen of a raster scan cathode ray tube, comprising:

means for generating a first sweep signal at a first deflection rate;

means for generating a first reference voltage, said first reference voltage being variable;

means coupled to said means for generating a first sweep signal and said means for generating a first reference voltage for superimposing said first sweep signal on said first reference voltage;

means for generating a second reference voltage, said second reference voltage being fixed;

means coupled to said means for superimposing said first sweep signal on said first reference voltage and to said means for generating a second reference voltage for providing a first distinct output when said superimposing signal exceeds said second reference voltage;

means for generating a third reference voltage, said third reference voltage being fixed and greater than said second reference voltage;

means for providing a second distinct output a predetermined time after the provision of said first output, said means including means coupled to said first sweep signal superimposing means and said means for generating a third reference voltage for providing said second output when said superimposed signal exceeds said third reference voltage; and means coupled to said first and second output providing means for generating a game symbol.

15. Apparatus for generating and controlling a symbol adaptable for display on the screen of a raster scan cathode ray tube, comprising:

means for generating a first sweep signal at a first deflection rate;

means for generating a first reference voltage, said first reference voltage being variable;

means coupled to said means for generating a first sweep signal and said means for generating a first reference voltage for superimposing said first sweep signal on said first reference voltage;

means for generating a second reference voltage, said second reference voltage being variable;

means coupled to said means for superimposing said first sweep signal on said first reference voltage and to said means for generating a second reference voltage for providing a first distinct output when said superimposing signal exceeds said second reference voltage;

means for generating a third reference voltage, said third reference voltage being variable and greater than said second reference voltage;

means for providing a second distinct output a predetermined time after the provision of said first output, said means including means coupled to said first sweep signal superimposing means and said means for generating a third reference voltage for providing said second output when said superimposed signal exceeds said third reference voltage; and means coupled to said first and second output providing means for generating a game symbol.

16. Apparatus for generating and controlling a symbol adapatable for display on the screen of a raster scan cathode ray tube, comprising:

means for generating a first sweep signal at a first deflection rate;

means for generating a first reference voltage;

means coupled to said means for generating a first sweep signal and said means for generating a first reference voltage for superimposing said first sweep signal on said first reference voltage;

means for generating a second reference voltage;

means coupled to said means for superimposing said first sweep signal on said first reference voltage and to said means for generating a second reference voltage for providing a first distinct output when said superimposing signal exceeds said second reference voltage;

means for providing a second distinct output a predetermined time after the provision of said first output;

means for generating a second sweep signal at a second deflection rate;

means for generating a fourth reference voltage, said fourth reference voltage being variable;

means for generating a fifth reference voltage, said fifth reference voltage being fixed;

means coupled to said means for generating a second sweep signal and said means for generating a fourth reference voltage for superimposing said second sweep signal on said fourth reference voltage;

means coupled to said superimposing means and said means for generating a fifth reference voltage for providing a third distinct output when said superimposed sweep signal exceeds said fifth reference voltage;

means for generating a sixth reference voltage, said sixth reference voltage being fixed and greater than said fifth reference voltage;

means for providing a fourth distinct output a predetermined time after the provision of said third output, said means including means coupled to said second sweep signal superimposing means and said means for generating a sixth reference voltage for providing said output when said superimposed signal exceeds said sixth reference voltage; and means coupled to said first, second, third and fourth output providing means for generating a game symbol.

* * * * *